(12) United States Patent
Williams et al.

(10) Patent No.: US 6,524,492 B2
(45) Date of Patent: Feb. 25, 2003

(54) COMPOSITION AND METHOD FOR INCREASING WATER AND OIL REPELLENCY OF TEXTILES AND CARPET

(75) Inventors: Michael S. Williams, Rome, GA (US); R. Richard Sargent, Rome, GA (US)

(73) Assignee: Peach State Labs, Inc., Rome, GA (US)

( * ) Notice: Subject to any disclaimer, the term of this patent is extended or adjusted under 35 U.S.C. 154(b) by 0 days.

(21) Appl. No.: 09/751,706

(22) Filed: Dec. 28, 2000

(65) Prior Publication Data

US 2002/0151644 A1 Oct. 17, 2002

(51) Int. Cl.⁷ .......................................... D06M 15/263

(52) U.S. Cl. .................. 252/8.62; 106/2; 252/8.61; 427/393.4; 8/115.6

(58) Field of Search ........................... 252/8.62, 8.61; 106/2; 427/393.4; 8/115.6

(56) References Cited

U.S. PATENT DOCUMENTS

| | | | |
|---|---|---|---|
| 1,901,536 A | 3/1933 | Schäfer ...................... 528/150 |
| 1,972,754 A | 9/1934 | Biedermann .................. 260/3 |
| 1,988,985 A | 1/1935 | Schäfer ........................ 149/5 |
| 2,036,161 A | 3/1936 | Schuette et al. ................ 149/5 |
| 2,112,361 A | 3/1938 | Fischer .......................... 260/4 |
| 2,171,806 A | 9/1939 | Russell et al. ................. 260/49 |
| 2,205,883 A | 6/1940 | Graves .......................... 149/5 |
| 2,566,149 A | 8/1951 | Strain .......................... 260/80 |
| 2,581,390 A | 1/1952 | De Groote et al. ........... 260/52 |
| 2,639,279 A | 5/1953 | Caldwell ................... 260/78.4 |
| 2,952,663 A | 9/1960 | Wasserman ................. 260/46 |
| 3,005,795 A | 10/1961 | Busse et al. ............... 260/45.5 |
| 3,126,358 A | 3/1964 | Lemmerich ............... 260/45.7 |
| 3,148,234 A | 9/1964 | Boyer ........................ 264/211 |
| 3,221,079 A | 11/1965 | Harris ........................ 260/844 |
| 3,248,276 A | 4/1966 | Bean, Jr. et al. ............. 161/195 |
| 3,258,425 A | 6/1966 | Burke .......................... 252/17 |
| 3,294,871 A | 12/1966 | Schmitt et al. ............. 260/900 |
| 3,331,730 A | 7/1967 | Bean, Jr. et al. ............. 161/192 |
| 3,406,005 A | 10/1968 | Whitfield et al. ............ 8/115.5 |
| 3,408,319 A | 10/1968 | Rau ............................. 260/23 |
| 3,481,890 A | 12/1969 | Güldenpfennig ............. 260/20 |
| 3,577,212 A | 5/1971 | Jirou et al. .................. 8/115.5 |
| 3,622,543 A | 11/1971 | Garforth ..................... 260/78 R |
| 3,679,541 A | 7/1972 | Davis et al. ................. 161/175 |
| 3,691,118 A | 9/1972 | Fishman ................. 260/19 UA |
| 3,818,058 A | 6/1974 | Jaeger ........................ 260/408 |
| 3,843,576 A | 10/1974 | Parkinson .................. 260/29.3 |

(List continued on next page.)

FOREIGN PATENT DOCUMENTS

| | | | |
|---|---|---|---|
| AU | 40853/89 | 3/1990 | ............ D01D/1/02 |
| EP | 0118983 | 9/1984 | .......... D06M/13/34 |
| EP | 0175225 | 3/1985 | .......... C07D/251/50 |
| EP | 0235980 | 9/1987 | .......... D06M/15/41 |
| EP | 0235989 | 9/1987 | .......... D06M/15/41 |
| EP | 0267681 | 5/1988 | .......... D06M/15/41 |
| EP | 0268374 | 5/1988 | ............. C08G/8/28 |
| EP | 2698059 | * 6/1988 | |
| EP | 0305021 | 3/1989 | ........... C09B/62/51 |
| EP | 0328822 | 8/1989 | .......... D06M/15/41 |
| EP | 0329899 | 8/1989 | .......... D06M/15/41 |
| EP | 0332342 | 9/1989 | ........ D06M/15/263 |
| EP | 0345212 | 12/1989 | .......... D06M/15/41 |
| EP | 0373655 | 6/1990 | ............. D01F/1/04 |
| EP | 0417960 | 3/1991 | ........ D06M/15/263 |
| GB | 1379611 | 1/1975 | ............. D06P/3/62 |
| GB | 1428382 | 3/1976 | ............. D06P/3/24 |
| GB | 1473062 | 5/1977 | ............. D06P/1/52 |
| GB | 1542773 | 3/1979 | ........... C09B/62/08 |
| GB | 2119367 | 11/1983 | ......... C07D/251/40 |
| JP | 45-30574 | 10/1970 | |
| JP | 54-028358 | 3/1979 | ............ C08L/67/02 |
| JP | 56-049775 | 5/1981 | .............. C09J/3/14 |
| JP | 58-136639 | 8/1983 | ............ C08L/23/02 |
| JP | 58-187441 | 11/1983 | ............ C08L/23/02 |
| JP | 58-196247 | 11/1983 | ............ C08L/23/02 |
| JP | 59-035315 | 2/1984 | ............. H01B/3/44 |
| JP | 59-219343 | 12/1984 | ............. C08J/9/04 |
| JP | 62-084160 | 4/1987 | ......... C09B/62/513 |
| JP | 62-174252 | 7/1987 | ............ C08L/61/04 |
| JP | 63-027585 | 2/1988 | ............. C09K/3/18 |
| JP | 64-40510 | * 2/1989 | |
| JP | 01-190755 | 7/1989 | ........... C08L/77/00 |
| JP | 02-026919 | 1/1990 | ............. D01F/6/92 |
| JP | 4-296302 | * 10/1992 | |
| JP | 6-73108 | * 3/1994 | |
| WO | WO 87/01745 | 3/1987 | ............ D06M/7/00 |
| WO | WO 91/14512 | 10/1991 | ............ B05D/1/36 |
| WO | WO 92/18332 | 10/1992 | ........... B32B/27/12 |
| WO | WO 93/05109 | 3/1993 | ............. C08K/5/35 |
| WO | WO 94/02549 | 2/1994 | ............ C09B/67/00 |

OTHER PUBLICATIONS

Gilbert, Everett E., *Sulfonation and Related Reactions*, Interscience Publishers, 1965, pp. 374–383. (no month).

Knop., A. et al., *Phenolic Resins*, Springer–Verlag, 1985, pp. 46–47. (no month).

Moncrieff, R. W., *Man–Made Fibres*, Heywood Books, 1966, pp. 646–651. (no month).

(List continued on next page.)

*Primary Examiner*—Anthony J. Green
(74) *Attorney, Agent, or Firm*—Bruce D. Gray; Kilpatrick Stockton LLP (57) ABSTRACT

The invention relates to an exhaustion agent, which is an aqueous emulsion of polymerized monomers, wherein the monomers contain:

(meth)acrylic acid (MAA);

alkyl (meth)acrylate, such as methyl (meth)acrylate (MMA); and a substituted or unsubstituted styrene; and having an average particle size of the emulsified particles is less than about 220 nm.

23 Claims, 1 Drawing Sheet

U.S. PATENT DOCUMENTS

| | | | |
|---|---|---|---|
| 3,851,012 A | 11/1974 | Wertz et al. | 260/845 |
| 3,912,681 A | 10/1975 | Dickson | 260/29.6 H |
| 3,936,316 A | 2/1976 | Gulla | 134/3 |
| 3,950,294 A * | 4/1976 | Connelly et al. | 428/500 |
| 3,953,352 A | 4/1976 | Mizutani et al. | 252/142 |
| 3,958,061 A | 5/1976 | Singer et al. | 428/276 |
| 3,959,559 A | 5/1976 | Kimoto et al. | 428/394 |
| 3,961,881 A | 6/1976 | Sumner et al. | 8/17 |
| 3,985,900 A | 10/1976 | Stephan | 426/1 |
| 3,988,108 A | 10/1976 | Segoshi et al. | 8/18 R |
| 3,994,744 A | 11/1976 | Anderle et al. | 134/4 |
| 3,994,990 A | 11/1976 | Foote | 260/857 TW |
| 4,014,857 A | 3/1977 | Schmoyer | 260/67.6 R |
| 4,046,944 A | 9/1977 | Mueller et al. | 428/262 |
| 4,056,354 A | 11/1977 | Pittman et al. | 8/54 |
| 4,058,498 A | 11/1977 | Bonnet | 260/29.4 R |
| 4,063,885 A | 12/1977 | Mares et al. | 8/115.7 |
| 4,072,784 A | 2/1978 | Cirino et al. | 428/507 |
| 4,081,383 A | 3/1978 | Warburton, Jr. et al. | 428/96 |
| 4,082,739 A | 4/1978 | Seitz | 260/146 T |
| 4,087,360 A | 5/1978 | Faust et al. | 210/58 |
| 4,129,416 A | 12/1978 | Bennett et al. | 8/115 |
| 4,164,477 A | 8/1979 | Whitley | 252/99 |
| 4,187,383 A | 2/1980 | Cowherd, III et al. | 560/224 |
| 4,193,902 A * | 3/1980 | Mondt et al. | 524/809 |
| 4,203,859 A | 5/1980 | Kirn et al. | 252/174.23 |
| 4,251,200 A | 2/1981 | Parkin | 425/131.5 |
| 4,285,690 A | 8/1981 | North | 8/186 |
| 4,285,738 A | 8/1981 | Ogata | 134/26 |
| 4,295,976 A | 10/1981 | Dessaint et al. | 252/8.9 |
| 4,300,898 A | 11/1981 | North | 8/185 |
| 4,317,859 A | 3/1982 | Smith | 428/389 |
| 4,334,876 A | 6/1982 | Beier et al. | 8/94.19 C |
| 4,345,063 A | 8/1982 | North | 528/245 |
| 4,350,494 A | 9/1982 | Scheidegger et al. | 8/636 |
| 4,382,799 A | 5/1983 | Davis et al. | 8/107 |
| 4,388,372 A | 6/1983 | Champaneria et al. | 428/395 |
| 4,400,414 A | 8/1983 | DeMott | 427/210 |
| 4,402,852 A | 9/1983 | Young | 252/182 |
| 4,404,116 A | 9/1983 | Young | 252/182 |
| 4,407,848 A | 10/1983 | Yamaguchi et al. | 427/36 |
| 4,416,787 A | 11/1983 | Marshall et al. | 252/8.8 |
| 4,426,476 A * | 1/1984 | Chang | 524/168 |
| 4,448,839 A | 5/1984 | Morris | 428/267 |
| 4,448,841 A | 5/1984 | Glass et al. | 428/270 |
| 4,466,893 A | 8/1984 | Dill | 252/8.55 C |
| 4,472,283 A | 9/1984 | Brooks | 210/698 |
| 4,477,514 A | 10/1984 | Gee et al. | 428/264 |
| 4,501,591 A | 2/1985 | Ucci et al. | 8/495 |
| 4,507,324 A | 3/1985 | Olive' et al. | 428/375 |
| 4,518,649 A | 5/1985 | Wang et al. | 428/284 |
| 4,526,581 A | 7/1985 | Prentiss et al. | 8/94.33 |
| 4,555,348 A | 11/1985 | Moran | 252/1 |
| 4,565,838 A | 1/1986 | Paar et al. | 523/414 |
| 4,579,924 A * | 4/1986 | Schwartz et al. | 428/392 |
| 4,582,882 A * | 4/1986 | Lynn et al. | 428/392 |
| 4,592,940 A | 6/1986 | Blyth et al. | 428/86 |
| 4,595,518 A | 6/1986 | Raynolds et al. | 252/8.6 |
| 4,596,582 A | 6/1986 | Logullo, Sr. | 8/115.6 |
| 4,663,372 A | 5/1987 | Okamoto et al. | 524/100 |
| 4,673,522 A | 6/1987 | Young | 252/87 |
| 4,680,212 A | 7/1987 | Blyth et al. | 428/97 |
| 4,690,995 A | 9/1987 | Keskey et al. | 525/66 |
| 4,692,314 A | 9/1987 | Etani | 422/265 |
| 4,695,488 A | 9/1987 | Hisamoto | 427/385.5 |
| 4,699,812 A | 10/1987 | Munk et al. | 427/393.4 |
| 4,739,002 A | 4/1988 | Ishikawa et al. | 524/270 |
| 4,756,888 A | 7/1988 | Gallup et al. | 423/42 |
| 4,780,099 A | 10/1988 | Greschler et al. | 8/115.6 |
| 4,787,989 A | 11/1988 | Fanelli et al. | 252/8.6 |
| 4,818,587 A | 4/1989 | Ejima et al. | 428/198 |
| 4,822,373 A | 4/1989 | Olson et al. | 8/115.6 |
| 4,830,766 A | 5/1989 | Gallup et al. | 252/8.552 |
| 4,839,212 A | 6/1989 | Blyth et al. | 428/96 |
| 4,859,207 A | 8/1989 | Bouwknegt et al. | 8/455 |
| 4,863,619 A | 9/1989 | Borcher, Sr. et al. | 252/8.6 |
| 4,865,885 A | 9/1989 | Herlant et al. | 427/322 |
| 4,875,901 A | 10/1989 | Payet et al. | 8/115.56 |
| 4,879,180 A | 11/1989 | Blyth et al. | 428/395 |
| 4,882,202 A | 11/1989 | Holtzman et al. | 427/98 |
| 4,886,707 A | 12/1989 | Marshall | 428/395 |
| 4,894,169 A | 1/1990 | Delitsky | 210/698 |
| 4,904,735 A | 2/1990 | Chapman, Jr. et al. | 525/199 |
| 4,906,384 A | 3/1990 | Hamilton | 210/697 |
| 4,937,123 A | 6/1990 | Chang et al. | 428/96 |
| 4,940,757 A | 7/1990 | Moss, III et al. | 525/502 |
| 4,963,409 A | 10/1990 | Liss et al. | 428/96 |
| 4,965,325 A | 10/1990 | Liss et al. | 525/508 |
| 5,015,259 A | 5/1991 | Moss, III et al. | 8/115.6 |
| 5,061,763 A | 10/1991 | Moss, III et al. | 525/502 |
| 5,069,941 A | 12/1991 | Ohmori et al. | 427/385.5 |
| 5,073,442 A | 12/1991 | Knowlton et al. | 428/267 |
| 5,124,438 A | 6/1992 | Brueckmann et al. | 530/354 |
| 5,132,368 A | 7/1992 | Chapman, Jr. et al. | 525/165 |
| 5,212,272 A * | 5/1993 | Sargent et al. | 524/745 |
| 5,215,602 A | 6/1993 | Ali et al. | 148/23 |
| 5,223,179 A | 6/1993 | Connor et al. | 252/548 |
| 5,223,340 A | 6/1993 | Moss, III et al. | 428/395 |
| 5,234,466 A | 8/1993 | Sargent et al. | 8/585 |
| 5,308,401 A | 5/1994 | Geke et al. | 134/2 |
| 5,310,828 A | 5/1994 | Williams | 525/502 |
| 5,316,850 A | 5/1994 | Sargent et al. | 428/378 |
| 5,380,518 A | 1/1995 | Roozdar et al. | 423/477 |
| 5,427,748 A | 6/1995 | Wiedrich et al. | 422/264 |
| 5,459,188 A | 10/1995 | Sargent et al. | 524/319 |
| 5,464,911 A | 11/1995 | Williams et al. | 525/502 |
| 5,520,962 A | 5/1996 | Jones, Jr. | 427/393.4 |
| 5,629,376 A | 5/1997 | Sargent et al. | 524/745 |
| 5,672,279 A | 9/1997 | Sargent et al. | 210/698 |
| 6,225,403 B1 * | 5/2001 | Knowlton | 524/501 |

OTHER PUBLICATIONS

Sperling, L. H., *Interpenetrating Polymer Networks and Related Materials*, Plenum Press, 1981, pp. 105–165. (no month).

Radian Corporation, *Polymer Manufacturing: Technology and Health Effects*, Noyes Data Corporation, 1986, pp. 224–231. (no month.

*The Merck Index: An Encyclopedia of Chemicals, Drugs, and Biologicals*, Merck & Co., Inc., 1983, p. 657. (no month).

*Vitech BJS–I Acid Replacement Technology*, Vitech International, Inc., 1997. (no month).

Ika, Prasad V. et al., "A Review of Crosslinked Polydiacetylenes and Their Interpenetrating Polymer Networks (IPNs) with Epoxy and Resin," *Advances in Interpenetrating Polymer Networks*, vol. 1, Eds. D. Klempner et al., Technomic Publishing Company, Inc., 1989, pp. 11–19. (no month).

Jia, Denim et al., "Interpenetrating Polymer Networks Based on Polybutadiene–Based Polyurethane," *Advances in Interpenetrating Polymer Networks*, vol. 1, Eds. D. Klempner et al., Technomic Publishing Company, Inc., 1989, pp. 303–327. (no month).

Qin, J. et al., "Interpenetrating Polymer Networks in Acrylic Blends and Their Fibers," *Advances in Interpenetrating Polymer Networks*, vol. II, Eds. D. Klempner et al., Technomic Publishing Company, Inc., 1990, pp. 205–237. (no month).

Talmon, Yeshayahu, "The Study of Latex IPNs by Cryo-TEM Using Radiation–Damage Effects," *Advances in Interpenetrating Polymer Networks*, vol. II, Eds. D. Klempner et al., Technomic Publishing Company, Inc., 1990, pp. 141–156. (no month).

Bell, Sandra J., "Garment Dyeing with Fiber Reactive Dyes," *American Dyestuff Reporter*, vol. 77, No. 5, May 1988, pp. 36–51.

Jose, D. J., et al., "Stain Resistant Carpets," *Canadian Textile Journal*, Nov. 1988, pp. 34–36.

Kawamoto, "Polyamide Felts for Paper Manufacturing with Resistance to Degradation by Bleach," (JP 63–152497), *Chemical Abstracts*, 110:156016k, vol. 110, No. 18, May 1, 1989.

Bolyachevskaya, K. I. et al., "Changes in the Rates of Intramolecular Thermochemical Reactions to Polycomplexes," *Chemical Abstracts*, 107:7734d, vol. 107, No. 2, Jul. 13, 1987.

Chatterjee, S.K. et al., "Selectivity in Interpolymer Complexation Involving Nonionic Polymers, Polycarboxylic Acid and Phenolic Polymers," *Chemical Abstracts*, 106:214512z, vol. 106, No. 26, Jun. 29, 1987.

Gyori, Erzsebet et al., "Household Scale Solvent," (HU 37811), *Chemical Abstracts*, 105:117062z, vol. 105, No. 14, Oct. 6, 1986.

Matsuo, Akihiro et al., "Vinyl Ester Resins," (JP 60–245619), *Chemical Abstracts*, 104:225778a, vol. 104, No. 26, Jun. 30, 1986.

Meisei Chemical Works, Ltd., "Improving of Heat–resistance of Polyamide Fibers," (JP 59–204977), *Chemical Abstracts*, 102:205391z, vol. 102, No. 24, Jun. 17, 1985.

Shin–Etsu Chemical Industry Co., Ltd., "Compositions for Treatment of Fabrics," (JP 59–216985), *Chemical Abstracts*, 102:186629q, vol. 102, No. 22, Jun. 3, 1985.

Toyobo Co. Ltd., "Soil–resistant Finishes for Fiber Products," (JP 60–002780), *Chemical Abstracts*, 102:186631j, vol. 102, No. 22, Jun. 3, 1985.

Toray Industries, Inc., "Synthetic Fibers with Water–, Oil–, and Soil–repellence," (JP 59–204921), *Chemical Abstracts*, 102:168269t, vol. 102, No. 20, May 20, 1985.

Toyobo Co., Ltd., "Soil–resistant Synthetic Fiber Manufacture," (JP 59–204974), *Chemical Abstracts*, 102:168270m, vol. 102, No. 20, May 20, 1985.

Toyobo Co., Ltd., "Soil–resistant Synthetic Fibers," (JP 59–228071), *Chemical Abstracts*, 102:168285w, vol. 102, No. 20, May 20, 1985.

Sumitomo Chemical Co., Ltd., "Dyeing Mixed Fiber Material," (JP 59–199877), *Chemical Abstracts*, 102:115098e, vol. 102, No. 14, Apr. 8, 1985.

Kosicek et al., "Dispersion Adhesive for Films Based on Plastics and Paper Impregnated by Synthetic Resins," (CS 209,298), *Chemical Abstracts*, 99:196330u, vol. 99, No. 24, Dec. 12, 1983.

Venkataboopathy et al., "Studies on Modification of Vegetable Tannins: Modified Ghat–bor Extract as Retaining Agent," *Chemical Abstracts*, 99:124391s, vol. 99, No. 16, Oct. 17, 1983.

Sumitomo Chemical Co. Ltd., "Dyeing by Triazine Compounds," (JP 57–199878), *Chemical Abstracts*, 98:199765e, vol. 98, No. 24, Jun. 13, 1983.

Letta, Bruce M., et al., "Oily–soil Release for Easy–care Cotton Fabrics," *Chemical Abstracts*, 95:134214t, vol. 95, No. 16, Oct. 19, 1981.

Akiyama, Yoshitami, "Finishing of Synthetic Fabrics for Improved Resistance to Heat," (JP 54–13110), *Chemical Abstracts*, 92:95595j, vol. 92, No. 12, Mar. 24, 1980.

Tetsuya, Mizuno et al., "Waterproofing and Oilproofing of Fibers," (JP 51–023489), *Chemical Abstracts*, 85:48216g, vol. 85, No. 8, Aug. 23, 1976.

Ukihashi, Horoshi et al., "Oil and Water Repellents with Soil Release Properties," (JP 50–020991), *Chemical Abstracts*, 116838x, vol. 83, No. 14, Oct. 6, 1975.

Chiyoda, Akiyoshi, "Soil–Releasing Fiber Goods," (JP 49–027000), *Chemical Abstracts*, 100014u, vol. 82, No. 16, Apr. 21, 1975.

Shima, Tsukasa, "Antistatic, Stain–resistant Polyester Textiles," (JP 48–099500), *Chemical Abstracts*, 14670c, vol. 81, No. 4, Jul. 29, 1974.

Tohgo, Masayuki, "Fusion–resistant Synthetic Polyamide Fiber," (JP 48–024407), *Chemical Abstracts*, 97290g, vol. 80, May 6, 1974.

Togo, Masayuki, "Antistain Treatment of Synthetic Fibers," (JP 47–014080), *Chemical Abstracts*, 153836s, vol. 77, No. 24, Dec. 11, 1972.

Dehlinger, Peter J., "A Not–so–Radical Proposal for Selecting Radical Substitutions in Markush–Type Claims," *Journal of the Patent and Trademark Office Society*, vol. 74, No. 7, Jul. 1992, pp. 463–480.

Cooke, T.F., "Soil Release Finishes for Fibers and Fabrics, "*Textile Chemist and Colorist*, vol. 19, No. 1, Jan. 1987, pp. 31–41.

Anton, A. "Polyamide Fiber Reactive Chemical Treatments for Differential Dyeability," *Textile Chemist and Colorist*, vol. 13, No. 2, Feb. 1981, pp. 45–50.

Carr, J., "Nylon and the Carpet Industry," *Textile Horizons*, Jun. 1988, pp. 43–45.

Vinokurova, L. N. et al., "Organofluorine Compounds for Oil/Water–repellent and Acid–resistant Finishing," *World Textile Abstracts*, 1985/6293, vol. 17, No. 19, Oct. 15, 1985.

Hebeish, A. et al., "Chemical Factors Affecting Soiling and Soil Release From Cotton–containing Durable–press Fabrics. XXV. Inclusion of Different Copolymers," *World Textile Abstracts*, 1985/482, vol. 17, No. 2, Jan. 31, 1985.

Kissa, E., "Soil–release—Past, Present and Future," *World Textile Abstracts*, 1984/6330, vol. 16, No. 19, Oct. 15, 1984.

Ciba–Geigy A.G. et al., "Reactive Dyes, Their Preparation and Their Use," (EP 0,089,923), *World Textile Abstracts*, 1983/7783, vol. 15, No. 24, Dec. 31, 1983.

Ciba–Geigy A.G. et al., "Reactive Dyes, Their Preparation and Their Use," (EP 0,085,025), *World Textile Abstracts*, 1983/6589, vol. 15, No. 20, Oct. 31, 1983.

Ciba–Geigy A.G. et al., "Reactive Dyes, Their Preparation and Their Use," (EP 0,085,654), *World Textile Abstracts*, 1983/6590, vol. 15, No. 20, Oct. 31, 1983.

* cited by examiner

FIG. 1

COMPOSITION AND METHOD FOR INCREASING WATER AND OIL REPELLENCY OF TEXTILES AND CARPET

BACKGROUND OF THE INVENTION

1. Field of the Invention

The invention relates to compositions and methods for increasing the water and oil repellency of fibers in textiles, in particular in upholstery textiles, and in carpet and other floor coverings. More particularly, the invention relates to compositions containing terpolymers and fluorochemical compounds that impart strong water and oil repellency to textiles and carpet fibers, and that have good durability to shampooing or other cleaning processes.

2. Description of Related Art

Fluorinated carbon compounds have been used extensively to impart water and oil repellency to textile and carpet fibers. Part of their desirability for this use stems from their ability to provide both oil and water repellency simultaneously, unlike waxes, silicones, etc., which typically provide water repellency, but are somewhat oleophilic, and thus do not provide good oil repellency. Fluorinated or perfluorinated alkyl compounds, when applied to fibers in sufficient amount, lower the surface tension of the fiber or fabric below the surface energy of water or oils that might be spilled onto the fabric. This allows these liquids to be removed before they can penetrate into the fabric or fiber. Obviously, this is of great benefit for fibers and fabrics that are used in residential, commercial, and industrial settings, since the useful life of the fabric or fibers is substantially increased, as is their aesthetic value.

Fluorinated hydrocarbons have been predominantly made by two methods. Electrofluorination has been used by 3M Corporation and by Dainippon Ink Chemicals to directly perfluorinate a sulfonated hydrocarbon with hydrofluoric acid, ultimately producing a perfluorinated sulfonamide. This method has fallen into disfavor for environmental and health reasons. Specifically, certain of the intermediates of this process have been found to be extremely bioaccumulative.

Telomerization of tetrafluoroethylene or other fluorinated monomers, used by Asahi Glass, Atochem, Daikin, DuPont, and Clariant, has been used to produce a range of fluoroalkyl products. The telomerization process is becoming a preferred technique for producing fluorinated compounds because it does not implicate the same environmental and health concerns as the electrofluorination process.

Along with the increasing popularity of fluorochemicals produced by telomerization, there has been an increasing desire to provide telomeric fluorochemical compositions that are highly exhaustible onto nylon and other fibers of carpets and textiles. This allows these compositions to be applied in an exhaust bath, such as during dyeing, prior to sale to consumers. This, in turn, reduces or eliminates the need for purchasers and mill workers to be exposed to aerosolized fluorochemicals, and avoids the need for the surfactants typically required for foam application. It also provides for better penetration of the fiber by the fluorochemical.

One method for exhaust application of fluorochemicals onto carpet fiber has been described in U.S. Pat. No. 5,520,962, the entire contents of which are hereby incorporated by reference. In this patent, fluorochemicals are combined and applied with a particular type of stain-resist composition, which is described as "an anionic polymer binding compound" that is alleged to improve the performance of the fluorochemical, possibly by holding the fluorochemical to the surface of the fiber. However, even with the use of "anionic polymer binding compounds," the process disclosed in the '962 patent does not achieve the high exhaustion levels desired in the industry, and economically necessary in order to reduce waste of expensive fluorinated reagents.

In addition, there is a need for compositions that are durable, at least in the sense that the treated fibers retain a significant portion of their repellency after shampooing. In particular, shampooing using commonly available, off-the-shelf carpet or fabric shampoos, which are often highly alkaline, can cause drastic decreases in oil or water repellency, as the fluorine-containing film is washed off of the fibers or fabric along with the soil. The repellency system described in the '962 patent does not achieve a fluoropolymer treatment having durability levels sufficient to withstand shampooings using alkaline carpet or textile cleaning shampoos.

A composition or treatment method that meets both of these needs would decrease the amount of fluorine that is consumed during the treatment process, significantly decreasing the cost of the fabric, fiber, or process.

Finally, there is a need to provide a fluorochemical composition that has the above properties, and is also storage stable, i.e., does not undergo gelation or phase-separation over time.

SUMMARY OF THE INVENTION

This invention satisfies the needs described above by providing an exhaustion agent that can be incorporated into a stable, emulsion polymerized, repellency composition. This composition is highly exhaustible onto nylon and other fabrics, deposits a high level of fluorine onto the fibers, and is highly durable to shampooing or other cleaning treatments.

In one embodiment, the invention relates to an exhaustion agent, which is an aqueous emulsion of polymerized monomers, wherein the monomers contain:

(meth)acrylic acid (MAA);
alkyl (meth)acrylate, such as methyl (meth)acrylate (MMA); and
a substituted or unsubstituted styrene, and wherein the average particle size of the emulsified particles is less than about 220 nm. A stable emulsion that does not undergo phase separation or gelation, and that has the requisite particle size has not been described in the patents referenced herein.

In another embodiment, the invention is a repellency enhancing composition containing a blend of a fluoropolymer, the exhaustion agent described above, and an optional hydrotrope. This composition has been found to provide theoretical or near theoretical exhaustion of fluorine onto fibers and fabrics, and the resulting oil and/or water repellency has been found to be excellent and very resistant to shampooing.

In another embodiment of the invention, the composition contains the above-described terpolymer of an MAA component, an MMA component, and a styrene component, but the terpolymer is prepared by emulsion polymerization in the presence of the fluoropolymer. While not wishing to be bound by any theory, it is believed that the terpolymer and fluoropolymer become associated, possibly by formation of an interpenetrating polymer network, and/or by other mechanisms, resulting in a high level of physical affinity of the terpolymer for the fluoropolymer, and conversely. Irrespective of mechanism, the combination of terpolymer exhaustion agent and fluoropolymer prepared in this manner are highly effective in exhausting theoretical or near theoretical levels of fluorine onto fibers or fabrics, and the resulting oil/water repellent materials have excellent durability to shampooing, as described above.

In yet another embodiment of the invention, the composition contains a polymer prepared by polymerizing the monomers of the terpolymer, in the presence of a fluoromonomer. The resulting polymer exhausts fluorine onto the fiber or fabric without any need for interaction with a separate fluoropolymer, since a single polymer provides both exhaustibility and fluorine for repellency.

The compositions of the invention provide stable fluorochemical emulsions that are highly exhaustible onto fibers and fabrics, in some cases achieving exhaustion levels of 95% to 100% of theoretical, and providing a high level of fluorine on the fiber surface, and thus providing excellent water and oil repellency. The resulting oil and water repellency provided by these compounds continues after shampooing, even with alkaline carpet or upholstery shampoos.

DETAILED DESCRIPTION OF SPECIFIC EMBODIMENTS

The exhaust agents and compositions of the invention can be used with a number of different fibers and fabrics prepared from the fibers. Suitable fibers include those extruded from synthetic materials include polyamides, such as nylon 6 and nylon 6,6, polyolefins, such as polypropylene, and polyesters, as well as natural fibers, such as wool or cotton.

The exhaust agents of the invention are generally in the form of emulsions, and generally have been prepared by an emulsion polymerization of an MAA component, an MMA component, and a styrene component. Either methacrylic acid or acrylic acid, or mixtures thereof, may be used as the MAA component. Similarly, methyl, ethyl, propyl, and other esters of methacrylic or acrylic acid, and mixtures thereof, may be used as the MMA component. The styrene component may be styrene per se, or may be styrene substituted with, e.g. sulfonate, phosphonate, carboxylate or hydrocarbyl groups. Methacrylic acid, methyl methacrylate, and unsubstituted styrene have been found to perform well when emulsion polymerized to form the exhaustion agent.

The MAA component is generally present in an amount ranging between about 20 wt % and about 80 wt %, more particularly about 30 wt % to about 80 wt %, based on the total polymerized monomers in the polymerization mixture. The styrene component is generally present in an amount ranging from about 20 wt % to about 80 wt %, more particularly, from about 20 wt % to about 60 wt %, based on the total polymerized monomers in the polymerization mixture. The MMA component is generally present in an amount ranging from about 5 wt % to about 80 wt %, more particularly from about 5 wt % to about 30 wt %, based on the total polymerized monomers in the polymerization mixture.

In addition to the three monomers described above, the reaction mixture can typically contain emulsifying agents, such as Biosoft D-40, in amounts ranging from about 0.1 wt % to 1.0 wt %, based on the total reaction weight; chelating agents, such as EDTA, Versene 100, etc., present in amounts ranging from about 0.01 wt % to about 0.05 wt %, based on the total reaction weight; a redox activator, such as ferrous sulfate, present in amounts ranging from about 0.01 wt % to about 0.05 wt %, based on the total reaction weight; oxidizing agents, such as ammonium persulfate (AMPS) and dibenzoyl peroxide, present in amounts ranging from about 0.01 wt % to about 0.20 wt %, based on the total reaction weight; reducing agents such as sodium hydrosulfite and sodium metabisulfite (SMBS) present in amounts ranging from about 0.01 wt % to about 0.20 wt %, based on the total reaction weight.

The monomers described above are emulsion polymerized in the presence of an emulsifying agent, such as Biosoft D-40, and redox initiators, such as AMPS and SMBS. Typically, the monomers are combined with water under agitation and, desirably, nitrogen sparging, along with the emulsifying agent, an optional chelating agent, such as EDTA, a reducing agent such as sodium hydrosulfite, and an optional redox activator such as ferrous sulfate. Free radical initiators, such as benzoyl peroxide may also be added, but are not strictly necessary. The redox initiators are added, typically as aqueous solutions, and an exothermic reaction proceeds, which generally raises the temperature of the reaction mixture from room temperature to 40–50° C. Cooling can be used to control the exotherm, but is not strictly necessary. The reaction is generally allowed to proceed for several hours until monomer conversion is complete, and can be quenched of excess reducing agent by addition of hydrogen peroxide. It has generally been found to be desirable to add all the emulsifying agent with the monomers, and to add additional water to the reaction mixture, as this can prevent the mixture from becoming too viscous, and provides a more desirable particle size. It is also desirable to add the redox initiators in solutions having concentrations ranging from about 10 g/l to about 400 g/l, and to add them gradually, or in several portions over the course of the reaction.

The emulsion polymerization typically produces emulsions having solids contents ranging from about 10 wt % to about 20 wt %, more particularly from about 11 wt % to about 18 wt %, more particularly from about 12–13 wt %. The emulsions typically have an average particle size that is less than about 220 nm, more particularly ranging from about 100 nm to about 200 nm, typically having a standard deviation ranging from about 40 nm to about 70 nm, more particularly from about 45 nm to about 55 nm.

The emulsion polymer formed by this process provides an exhaustion agent that substantially increases the level of exhaustion of fluoropolymers onto fabrics and fibers, yielding increased efficiency, decreased cost (since smaller amounts of expensive fluoropolymers are required to get the same level of oil and water repellency), and increased durability of repellency, as shown in more detail below.

The exhaustion agent described above can be blended with fluoropolymers prepared either by electrofluorination or by telomerization, but have been found to be particularly suitable for use with telomerized fluoropolymers. Any telomerized fluoropolymers can be combined with the exhaust agent to form an exhaustible composition according to the invention, including those produced by Asahi Glass, Atochem, Daikin, such as Daikin 3310 or 331 1, Dupont, such as Dupont Tufcoat (Anionic), and Clariant, such as the NUVA fluoropolymers, such as NUVA CPA, NUVA 5006, and Peach State Labs, such as Myafax WS.

The exhaustion agent and fluoropolymer can also be desirably combined with a hydrotrope, such as a solution of dodecyldiphenyloxide disulfonic acid, e.g. a 40 wt % solution obtained by diluting DBA-70 (70 wt % dodecyldiphenyloxide disulfonic acid), Pilot Corporation, with water. This helps the fluoropolymer and exhaustion agent to form a stable emulsion that does not undergo phase separation or gelation over time.

Desirably, these components are combined into an aqueous solution by blending them with water to form a suspension having a solids content ranging from about 10 wt % to about 20 wt %.

The resulting blended exhaustible composition can be applied as a composition having from about 0.7 g/l to about 6.0 g/l of the exhaustion agent, and about 0.5 g/l to about 1.5 g/l of fluoropolymer to fibers and/or fabrics at a rate ranging from about 10% to about 450% wet pick up. The fibers or fabrics may be dyed or otherwise treated, and are immersed in the exhaustible composition at a temperature ranging from about 20 to about 100° C. The fabrics are thoroughly soaked with the exhaustible composition at a pH of about 2–4 (the pH of the solution can be adjusted using, e.g., urea sulfate or urea hydrochloride, as well as other known pH adjusting agents), and desirably steamed for about 0.5 to about 2.0 minutes, rinsed, extracted (so that excess liquid is removed from the fiber or fabric), and dried at a temperature ranging from 80 to about 130° C. The treatment may be conducted in the dyebath, or as a separate process step occurring prior to or after drying.

The exhaustible composition has, as one embodiment, the blend described above. In another embodiment, the polymerization of the MAA, styrene, and MMA components can be conducted in the presence of the fluoropolymer, which is added to the reaction mixture prior to polymerization. Desirably, the fluoropolymer is added to the reaction mixture prior to the addition of redox initiators. Any of the fluoropolymers described above for use in the blended exhaustible composition can be used in this embodiment, and the amounts added are similar to those described above with respect to the blended exhaustible composition. Myafax WS (fluoropolymer, Peach State Labs) has specifically been found to be suitable. Other than adding fluoropolymer to the reaction mixture prior to initiator addition, this embodiment does not require any significant departure from the procedure described above for the blended composition. While not wishing to be bound by any theories, it is believed that the polymerization of the MAA, styrene, and MMA components in the presence of fluoropolymer results in a close association of these materials, such as in an interpenetrating polymer network (IPN) or other association. This association is believed to contribute to the near theoretical exhaustion of fluoropolymer onto the fibers or fabrics.

The methods of applying these compositions to fabrics or fibers does not depart significantly from that disclosed herein for the blended exhaustible compositions.

In yet another embodiment of the invention, the MAA, styrene, and MMA components of the emulsion polymer can be polymerized in the presence of fluoromonomer. While virtually any fluoromonomer can be used, those having a perfluoroalkyl moiety, a linking moiety (such as a carboalkoxy group), and a film forming moiety (such as an unsaturated hydrocarbyl group) have been found to be particularly suitable. Examples of suitable fluoromonomers include those produced by Clariant under the Fluowet El, Fluowet EA, Fluowet ET, Fluowet AC, and Fluowet MA tradenames. Fluowet MA 812, which has the telomer distribution shown below, has been found to be particularly suitable.

| | |
|---|---|
| $\Sigma R_F C_2 H_4 OCOC(CH_3)=CH_2$ | >90.0 |
| $\Sigma R_F C_4 H_8 OCOC(CH_3)=CH_2$ | <3.0 |
| $\Sigma R_F C_2 H_4 OH$ | <3.0 |
| $C_6 F_{13} C_2 H_4 OCOC(CH_3)=CH_2$ | <5.0 |
| $C_8 F_{17} C_2 H_4 OCOC(CH_3)=CH_2$ | 50–60 |
| $C_{10} F_{21} C_2 H_4 OCOC(CH_3)=CH_2$ | 20–28 |
| $>C_{12} F_{25} C_2 H_4 OCOC(CH_3)=CH_2$ | 8–15 |

In polymerizing the components of this reaction mixture, no significant departures are necessary from the general procedure described above with respect to preparing the exhaustion agent for the blended exhaustible composition, other than adding the fluoromonomer to the reaction mixture, desirably before addition of the redox initiators. Generally, the fluoromonomer is added in amounts ranging from about 15 wt % to about 70 wt %, based on polymer solids.

Similarly, application rates and methods do not differ significantly from the general procedures described above. While not wishing to be bound by any theory, it is believed that the fluoromonomers become closely associated with the polymer forming the exhaustion agent, either through incorporation into the polymer chain, or by some other mechanism, resulting in extremely high, near theoretical, exhaustion of fluorine onto the fibers or fabrics.

EXAMPLES

In the examples below (which merely illustrative, and are not intended to limit the scope of the claimed invention), oil and water repellency of various compositions is evaluated using a Dupont ZEPEL/TEFLON Specification Test Kit. This technique, recognized in the art, evaluates the repellency of a material to liquids that are progressively more "wetting." The contact angle of the liquid is measured after 30 seconds (oil) or 10 seconds (water), and a score assigned based whether the liquid wets the material. For example, a material that is wetted by n-tetradecane but not by n-hexadecane would be rated "3" for oil repellency. The ratings and liquids are set forth in the tables below, along with the surface tensions of some of the liquids. The surface tension of pure water is about 72 dyne/cm, and that of pure isopropanol is about 22 dyne/cm, so the surface tensions of mixtures used in the water repellency tests will be between these values.

| | Liquid | Surface Tension (dyne/cm) |
|---|---|---|
| Oil rating number | | |
| 1 | Nujol/Kaydol | 32 |
| 2 | 65/35 Nujol/n-hexadecane | |
| 3 | n-hexadecane | 27 |
| 4 | n-tetradecane | 26 |
| 5 | n-dodecane | 25 |
| Water rating number | | |
| 1 | 2% aq. Isopropanol | |
| 2 | 5% aq. Isopropanol | |
| 3 | 10% aq. Isopropanol | |
| 4 | 20% aq. Isopropanol | |
| 5 | 30% aq. Isopropanol | |

Example 1

An emulsion polymer was prepared by combining 137 g MAA, 53 g styrene, and 1 g MMA in 819.7 cc deionized water, 63 g Biosoft D-40 (sodium dodecylbenzenesulfonate) at a temperature of 21° C. To this mixture were added 6 g ammonium persulfate (AMPS, 25% solution) and 4 g sodium metabisulfate (SMBS, 20% solution), in aliquots over the first 30 minutes of reaction time. An additional 3 g AMPS and 2 g SMBS were added after about another 15 minutes of reaction time, and about 0.2 g ferrous sulfate was added shortly thereafter. An exotherm was noted, and mixture was reacted for about 1 hour reaction time, and allowed to cool. The result was a very viscous liquid having a solids content of about 18.6%.

Example 2

60 parts-by-weight of the liquid of Example 1 was combined with 25 pbw water, 13 pbw Daikin 3310 (Daikin, fluoropolymer), and 2 pbw of a 40% solids content solution of dodecyldiphenyloxide disulfonic acid (obtained by diluting DBA-70, Pilot Corporation, with water). The result was a stable emulsion that did not undergo gelation or phase separation.

Example 3

60 parts-by-weight of the liquid of Example 1 was combined with 25 pbw water, 13 pbw Daikin 3311 (Daikin, fluoropolymer), and 2 pbw of a 40% solids content solution of dodecyldiphenyloxide disulfonic acid (obtained by diluting DBA-70, Pilot Corporation, with water). The result was a stable emulsion that did not undergo gelation or phase separation.

Example 4

60 parts-by-weight of the liquid of Example 1 was combined with 24 pbw water, 13 pbw Nuva CPA (Clariant, fluoropolymer), and 3 pbw of a 40% solids content solution of dodecyldiphenyloxide disulfonic acid (obtained by diluting DBA-70, Pilot Corporation, with water). The result was a stable emulsion that did not undergo gelation or phase separation.

Example 5

60 parts-by-weight of the liquid of Example 1 was combined with 19 pbw water, 15 pbw Tufcoat Anionic (DuPont, fluoropolymer), and 6 pbw of a 40% solids content solution of dodecyldiphenyloxide disulfonic acid (obtained by diluting DBA-70, Pilot Corporation, with water). The result was a stable emulsion that did not undergo gelation or phase separation.

Example 6

60 parts-by-weight of the liquid of Example 1 was combined with 23 pbw water, 13 pbw Nuva 5006 (Clariant, fluoropolymer), and 4 pbw of a 40% solids content solution of dodecyldiphenyloxide disulfonic acid (obtained by diluting DBA-70, Pilot Corporation, with water). The result was a stable emulsion that did not undergo gelation or phase separation.

Example 7

2.1920 kg MAA were combined with 848.0 g styrene, 160.0 g MMA, 100.8 g Biosoft D-40, and 11.782 kg deionized water, with agitation. 69.0 g AMPS and 46.0 g SMBS were added after 30 minutes. 1.6 g $FeSO_4$ in 683 g water was added after 45 minutes under high agitation. The mixture formed a thick, paste-like mass (coagulum), which became less viscous on further agitation.

Example 8

382.4 g tap water was combined with 2.0 g. Biosoft D-40, 0.2 g Versene 100, 68.5 g MAA, 26.5 g styrene, 5.0 g MMA, 0.1 g benzoyl peroxide, and 0.1 g $FeSO_4 \cdot 7H_2O$ at 24° C. with agitation and under nitrogen sparging. $N_2$ sparging was discontinued after thirty minutes, and 0.2 g sodium hydrosulfite was added (in 5.8 g water). At 1.5 hours, 0.2 g AMPS (in 5.8 g water) was added. After 1 hour, 50 minutes, 0.2 g AMPS, 0.2 g SMBS, and 0.1 g $FeSO_4 \cdot 7H_2O$, each (in 5.8 g water) were added. After 2 hours reaction time, an additional 1 g Biosoft D-40 was added. By 3 hours, the mixture had cooled from a high temperature of 45° C. to 25° C., and was a thick liquid. It was diluted with 250 g water to provide an emulsion having a solids content of 12.5 wt %, a pH of 3.05, a viscosity of 40 cps (21° C., #1 spindle viscometer @ 30 rpm), and an average particle size of 184 nm (Coulter N4 MD submicron particle size analyzer).

Example 9

991.0 g water was combined with 5.2 g Biosoft D-40, 0.6 g Versene 100, 177.6 g MAA, 68.6 g styrene, 13.0 g MMA, 0.4 g benzoyl peroxide, and 0.4 g $FeSO_4 \cdot 7H_2O$ (in 9.6 g water) under agitation and $N_2$ sparging. After 30 minutes, 0.5 g sodium hydrosulfite (in 9.5 g water) was added, and $N_2$ sparging discontinued. After 40 minutes, 0.6 g AMPS (in 9.4 g water) was added. After 1 hour, 10 minutes, another 0.4 g $FeSO_4 \cdot 7H_2O$ (in 9.6 g water) was added, followed by 0.6 g SMBS (in 94 g water) and another 0.6 g AMPS (in 9.4 g water). At 1 hour, 15 minutes, 370.2 g water was added, then another 2.6 g Biosoft D-40, then another 370.2 g water. The resulting emulsion contained 12.0 wt % solids (93% of theoretical), had a viscosity of 14 cps (24° C., #1 spindle, 30 rpm), and a particle size of 174 nm.

Example 10

382.4 g tap water was combined with 2.0 g. Biosoft D-40, 0.2 g Versene 100, 68.5 g MAA, 26.5 g styrene, 5.0 g MMA, 0.1 g benzoyl peroxide, and 0.1 g $FeSO_4 \cdot 7H_2O$ at 24° C. with agitation and under nitrogen sparging. $N_2$ sparging was discontinued after thirty minutes, and 0.1 g sodium hydrosulfite was added in 5.8 g water. At 1 hour, another 0.1 g sodium hydrosulfite was added in 5.8 g water. At 1 hour, 10 minutes, 0.2 g AMPS in 5.8 g water was added. After 1 hour, 30 minutes, 0.2 g AMPS, 0.2 g SMBS, each in 5.8 g water, were added. After 1 hour, 50 minutes, 0.1 g $FeSO_4 \cdot 7H_2O$ (in 5.8 g water) was added. After 2 hours 10 minutes reaction time, an additional 1 g Biosoft D-40 in 161 g water was added. By 2 hours, 45 minutes, the mixture had cooled from a high temperature of 42° C. to 30° C., when 1 ml of hydrogen peroxide was added to quench any SMBS. It was an emulsion having a solids content of 15.5 wt %, and an average particle size of 154 nm.

Example 11

10.949 kg tap water was combined with 70.4 g Biosoft D-40, 4.0 g Versene 100, 1.603 kg MAA, 620.8 g styrene, 116.8 g MMA, 3.2 g benzoyl peroxide, and 3.2 g $FeSO_4 \cdot 7H_2O$ (dissolved in water) under agitation, with $N_2$ sparging at 19° C. After 30 minutes, 4.8 g sodium hydrosulfite (dissolved in water) was added. After 40 minutes, 4.8 g AMPS (dissolved in water) was added. After 1 hour, 10 minutes, 1.6 g $FeSO_4 \cdot 7H_2O$ (dissolved in water) was added, followed by 2.4 g AMPS, also dissolved in water. At 1 hour, 50 minutes, an additional 2.4 g AMPS and 2.4 g SMBS were added, both dissolved in water. 5.51 kg water was added, to provide a suspension having 12.3 wt % solids and an average particle size of 124 nm.

Example 12

11.55 kg water, 71 g Biosoft D-40, 4 g Versene 100, 1.603 kg MAA, 621 g styrene, 117 g MMA, 3.2 g benzoyl peroxide, and 3.2 g $FeSO_4 \cdot 7H_2O$ were combined (the styrene, MMA, and benzoyl peroxide were added together) at 21° C. with agitation (138 RPM) under $N_2$ sparging. After 30 minutes, 4.8 g sodium hydrosulfite dissolved in 50 g water was added, and 4.8 g AMPS dissolved in 50 g water was added 10 minutes after the AMPS. After 1 hour, 10 minutes, 1.6 g $FeSO_4 \cdot 7H_2O$ dissolved in 50 g water was added. 5 minutes later, 2.4 g AMPS dissolved in 50 g water was added. After 1 hour 40 minutes, an additional 2.4 g AMPS dissolved in 50 g water and 2.4 g SMBS dissolved in 50 g water were added. At 1 hour 50 minutes, 1.525 kg water was added, and at 2 hours, 20 minutes, an additional 3.744 kg water was added. The resulting emulsion had a solids content of 11.8 wt % and an average particle size of 130 nm.

Example 13

Figure 1:
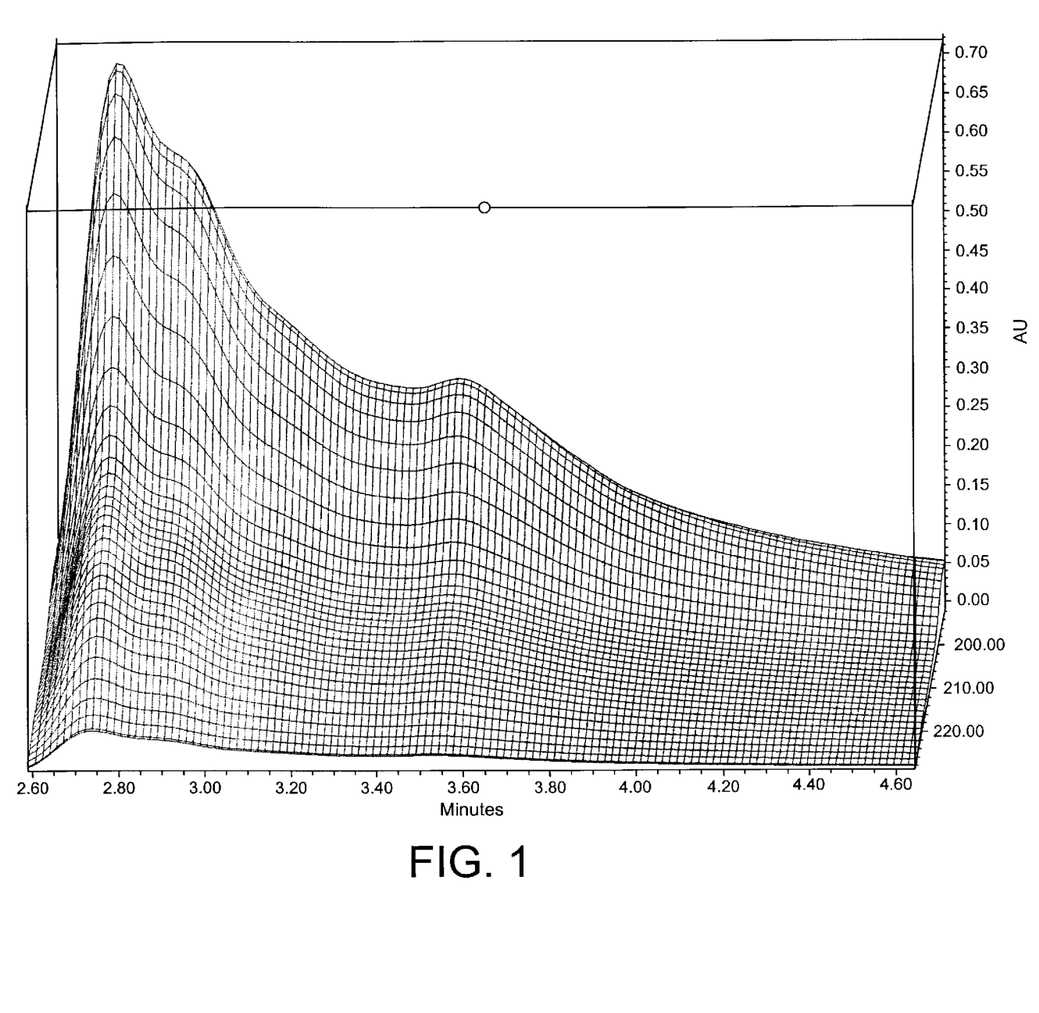
FIG. 1 is a three-dimensional graph of HPLC results obtained from a terpolymer used in a composition of the invention.

10.948 kg water, 71 g Biosoft D-40, 4 g Versene 100, 1.603 kg MAA, 621 g styrene, 117 MMA, and 3.2 g $FeSO_4 \cdot 7H_2O$ in 100 g water were combined at 18° C. under agitation (150 RPM) with $N_2$ sparging. After 30 minutes, 4.8 g sodium hydrosulfite in 50 g water were added, and sparging discontinued. After 40 minutes, 4.8 g AMPS in 50 g water were added. After 1 hour, 10 minutes, 1.6 g $FeSO_4 \cdot 7H_2O$ in 50 g water were added, followed by 2.4 g AMPS in 50 g water. After 1 hour, 40 minutes, 2.007 kg water were added, followed by 2.4 g AMPS in 50 g water, and 2.4 g SMBS in 50 g water. After 2 hours, 20 minutes, another 3.739 kg water was added. The resulting emulsion had a solids content of 12.5 wt % and an average particle size of 127 nm. A three-dimensional graph of the HPLC absorbance is shown in FIG. 1.

Example 14

356.9 g water, 2.4 g Biosoft D-40, 0.1 g Versene 100, 22.9 g MAA, 49.6 g styrene, 3.8 g MMA, and 0.1 g $FeSO_4 \cdot 7H_2O$ in 3.3 g water were combined with agitation under $N_2$ sparging. After about 30 minutes, 0.2 g sodium hydrosulfite in 1.6 g water was added, followed by 0.2 g AMPS in 1.6 g water. The agitation was increased, and after 1 hour 10 minutes, 0.05 g $FeSO_4 \cdot 7H_2O$ in 1.6 g water was added, followed by 0.1 g AMPS in 1.6 g water. After 1 hour, 50 minutes, 65.4 g water was added, followed by 0.1 g AMPS in 1.6 g water and 0.1 g SMBS in 1.6 g water at 2 hours. After 2.75 hours, another 85.1 g water was added. The reaction was stopped by adding 2.0 g hydrogen peroxide at 3.25 hours. The resulting emulsion had a solids content of 12.5 wt % and an average particle size of 196 nm.

Example 15

356.9 g water, 2.4 g Biosoft D-40, 0.1 g Versene 100, 15.3 g MAA, 61.0 g MMA, and 0.1 g $FeSO_4 \cdot 7H_2O$ in 1.6 g water were combined at 20° C. under agitation and $N_2$ sparging. After 30 minutes, 0.2 g sodium hydrosulfite in 1.6 g water was added and sparging discontinued. This was followed by 0.2 g AMPS in 1.6 g water. After about 53 minutes of reaction time, 65.4 g water was added, followed by another 85.1 g water at 1 hour, 5 minutes. At 1.25 hours, two aliquots of 0.1 g AMPS in 1.6 g water were added, along with 0.1 g SMBS in 1.6 g water. At 1.75 hours, 2.0 g hydrogen peroxide were added to stop the reaction. The resulting emulsion had a particle size of 388 nm and a solids content of 12.4 wt %.

Example 16

507.4 g water, 2.4 g Biosoft D-40, 0.1 g Versene 100, 61.0 g MAA, 15.3 g MMA, and 0.1 g $FeSO_4 \cdot 7H_2O$ in 3.2 g water were combined at 21° C. under agitation and $N_2$ sparging. After 30 minutes, 0.2 g sodium hydrosulfite in 1.6 g water was added, followed by 0.3 g AMPS in 3.2 g water. After 1 hour, 10 minutes reaction time, 0.1 g AMPS in 1.6 g water and 0.1 g SMBS in 1.6 g water were added. The resulting emulsion had a particle size of 211 nm and a solids content of 12.7 wt %.

Example 17

The emulsions of Examples 13, 14, 15, and 16 were formulated with Daikin 3310 fluoropolymer to form the blends indicated below and applied to a BASF Type 6 nylon tube that had been mock dyed by applying a 2 g/l solution of Isotac ACD at pH 6.0 at a rate of 350% wet pick up, steaming the tube for 3 min. in a vertical steamer, rinsing, extracting excess liquid to 80% wet pick up. The blends were applied as 5 g/l solutions at 350% wet pick up at pH 2.3 (maintained by adding urea sulfate as a pH adjuster), and the tubes were steamed for 45 sec in a vertical steamer, rinsed, extracted, and dried at 190° F. until dry. A piece of each tube was then tested for oil and water repellency using the DuPont ZEPEL/TEFLON Specification Test Kit, and for fluorine content using the combustion method (DuPont TM 0371-86). The remaining portion of the tube was then shampooed at 160° F. for 1 min. at a 10:1 liquor ratio in a 16.0 g/l solution of RUG DOCTOR Steam Cleaning Solution, rinsed, extracted, and dried. A piece of this shampooed tube was also tested for oil and water repellency and fluorine content using the test methods described above. The results are provided in the Table below. The theoretical ppm fluorine for 100% exhaustion of the emulsions tested is 240 ppm.

| Blend | Example No. | Weight Ratio[1] | Water Repellency[2] | Oil Repellency[3] | Fluorine Content[4] | Water Repellency[5] | Oil Repellency[6] | Fluorine Content[7] |
|---|---|---|---|---|---|---|---|---|
| 1 | No aftertreatment | — | 0 | 0 | 0 | 0 | 0 | 0 |
| 2 | Daikin 3310, water | 13:87 | 5 | 5 | 175 | 4 | 3 | 120 |
| 3 | 13 | 13:2:60:25 | 5 | 5 | 207 | 5 | 5 | 200 |
| 4 | 14 | 13:2:60:25 | 5 | 4 | 228 | 5 | 4 | 217 |

-continued

| Blend | Example No. | Weight Ratio[1] | Water Repellency[2] | Oil Repellency[3] | Fluorine Content[4] | Water Repellency[5] | Oil Repellency[6] | Fluorine Content[7] |
|---|---|---|---|---|---|---|---|---|
| 5 | 15 | 13:2:60:25 | 3 | 2 | 50 | 3 | 0 | 40 |
| 6 | 16 | 13:2:60:25 | 5 | 4 | 205 | 4 | 3 | 151 |

[1]The weight ratio of Daikin 3310 fluoropolymer to water in Blend 2 (control). The weight ratio of Daikin 3310:Dodecyldiphenyl oxide disulfonic acid (40 wt % solution):exhaustion agent:water in Blends 3–6.
[2]Before shampooing.
[3]Before shampooing.
[4]In ppm, before shampooing.
[5]After shampooing.
[6]After shampooing.
[7]In ppm, after shampooing.

Example 18

111.72 g deionized water, 120 g of 40 wt % sodium xylene sulfonate aqueous solution (SXS), 2.52 g Biosoft D-40, 100 g Myafax WS fluoropolymer, 41. 10 g MAA, 15.9 g styrene, and 3.0 g MMA were combined under agitation at 23° C. 3.5 g AMPS and 2.3 g SMBS were added, followed by 0.20 g $FeSO_4 \cdot 7H_2O$. The temperature of the mixture began to increase, and the viscosity increased as well, but then decreased. After about 3.5 hours of reaction time, the resulting emulsion was tested by applying (at a rate of 350% wet pick up) a 9 g/l solution to a BASF Type 6 nylon sock, steamed for 45 s in a vertical steamer, rinsed, extracted, and dried, and showed good water repellency (5) when tested using a DuPont ZEPEL/TEFLON Specification Test Kit.

Example 19

150 g of 40 wt % SXS, 3.15 g Biosoft D-40, 125 g Myafax WS fluoropolymer, 34.25 g MAA, 13.25 g styrene, 2.50 g MMA, and 170.85 g deionized water were combined at 21° C. under agitation. 0.50 g AMPS and 0.50 g SMBS, followed by 0.18 g $FeSO_4 \cdot 7H_2O$ were added. The emulsion was reacted for about 2.25 hours. The resulting product had a fluorine content of 2.05%. A 7 g/l solution was applied to a BASF Type 6 nylon sock at 350% wet pick up, steamed for 45 seconds in a vertical steamer, rinsed, extracted, and dried. It showed good water repellency (5) and good oil repellency (4) when tested using a DuPont ZEPEL/TEFLON Specification Test Kit. The exhausted fluorine on the fabric was 485 ppm out of 502 ppm theoretical.

Example 20

35.0 g MAA, 10.0 g styrene, 5.0 g MMA, 50.0 Fluowet MA-812 (Clariant fluoromonomer), 2.0 g Biosoft D-40, 382.4 g tap water, 0.2 g Versene 100, 0.2 g $FeSO_4 \cdot 7H_2O$ in 5.8 g water, 0.1 g benzoyl peroxide, and an additional 1.0 g Biosoft D-40 were combined at 20° C. under agitation and $N_2$ sparging. After 30 minutes, sparging was discontinued and 0.4 g sodium hydrosulfite in 11.6 g water was added, followed by 0.28 g AMPS in 5.8 g water. After 1 hour, 10 minutes, another 0.2 g AMPS in 5.8 g water and 0.2 g SMBS in 5.8 g water were added, along with another 100 g water. After 1.5 hours, 60.0 g water and 1 g hydrogen peroxide were added. The resulting emulsion had a fluorine content of 4.6%, and was applied as a 3 g/l solution to a BASF Type 6 nylon sock at 350% wet pick up. The sock material was steamed, rinsed, extracted, and dried. Testing using a using a DuPont ZEPEL/TEFLON Specification Test Kit gave good water repellency (5) and good oil repellency (5). The exhausted fluorine on the fabric was 475 ppm out of 483 ppm theoretical.

Comparative Example 1

The procedure followed is that described in part A of Example 1 of U.S. Pat. No. 4,081,383 (the entire contents of which patent are hereby incorporated by reference).

The following components were mixed under agitation:

| COMPONENT | PARTS BY WEIGHT |
|---|---|
| Water | 385.11 |
| Biosoft D-40 (sodium dodecylbenzenesulfonate) | 1.85 |
| Versene 100 (sodium salt of EDTA) | 0.19 |
| Styrene | 26.5 |
| Methylmethacrylate | 5.0 |
| Methacrylic acid | 68.5 |
| DIBPH (diisopropylbenzenehydroperoxide) | 0.10 |
| $FeSO_4 \cdot 7H_2O$ | 0.10 |

A nitrogen blanket was started, and 0.05 parts sodium sulfoxylateformaldehyde was added (in 5.75 parts water). The mixture was allowed to react for about 1 hour, during which time the temperature rose from about 19° C. to about 36° C. An additional 0.10 parts DIBHP and 0.05 parts sodium sulfoxylateformaldehyde (in 5.75 parts water) were added. At this point, the viscosity of the mixture increased to that of a viscous mass, so that little or no mixing was imparted by the agitation. At about 1.5 hours of reaction time, an additional 0.94 parts Biosoft D-40 were added, and the reaction continued for another 0.5 hour. The resulting material had a solids content of 19.5, a viscosity of about 1400 cps and a particle size (determined on a Coulter N4 MD submicron particle size analyzer) of 243 nm.

What is claimed is:

1. An exhaustion agent, comprising an aqueous emulsion of an exhaustion effective amount of polymerized monomers, wherein the monomers comprise:
   (meth)acrylic acid;
   alkyl (meth)acrylate; and
   a substituted or unsubstituted styrene;
and wherein the polymerized monomers form particles having an average particle size of less than about 220 nm.

2. The exhaustion agent of claim 1, wherein the polymerized monomers comprise about 20 wt % to about 80 wt % (meth)acrylic acid.

3. The exhaustion agent of claim 2, wherein the polymerized monomers comprise about 30 wt % to about 80 wt % (meth)acrylic acid.

4. The exhaustion agent of claim 1, wherein the polymerized monomers comprise about 5 wt % to about 80 wt % alkyl (meth)acrylate.

5. The exhaustion agent of claim 1, wherein the average particle size of the emulsified particles is less than about 215 nm.

6. The exhaustion agent of claim 5, wherein the average particle size of the emulsified particles is less than about 210 nm.

7. The exhaustion agent of claim 6, wherein the average particle size of the emulsified particles is between about 100 nm and about 210 nm.

8. The exhaustion agent of claim 1, wherein the monomers further comprise a fluorinated monomer.

9. The exhaustion agent of claim 8, wherein the fluorinated monomer comprises a perfluoroalkyl moiety.

10. The exhaustion agent of claim 9, wherein the fluorinated monomer further comprises a film forming moiety joined to the perfluoroalkyl moiety by a linking moiety.

11. The exhaustion agent of claim 10, wherein the film forming moiety comprises an unsaturated hydrocarbyl group.

12. The exhaustion agent of claim 11, wherein the linking moiety comprises a carbalkoxy group.

13. The exhaustion agent of claim 1, further comprising a fluoropolymer, and wherein the monomers have been polymerized in the presence of the fluoropolymer.

14. The exhaustion agent of claim 13, wherein the fluoropolymer forms an interpenetrating polymer network with the polymerized monomers.

15. A stable, exhaustible composition for treating fibers or fabric to increase oil repellency, water repellency, or both, comprising a stable aqueous dispersion of:
   a fluoropolymer;
   an exhaust agent comprising an exhaustion effective amount of an emulsion polymer of monomers comprising:
      (meth)acrylic acid;
      alkyl (meth)acrylate; and
      a substituted or unsubstituted styrene;
   and wherein the emulsion polymer comprises particles having an average particle size less than about 220 nm; and
   an optional hydrotropic compound.

16. The composition of claim 15, wherein the hydrotropic compound is an organic acid.

17. The composition of claim 16, wherein the organic acid is an aromatic sulfonic acid.

18. The composition of claim 17, wherein the aromatic sulfonic acid is a dodecyldiphenyloxide disulfonic acid.

19. The composition of claim 18, wherein the dodecyldiphenyloxide disulfonic acid is added as an aqueous solution having a solids content of about 40 wt % to about 70 wt %.

20. A stable, exhaustible composition for treating fibers or fabric to increase oil repellency, water repellency, or both, comprising a stable aqueous dispersion of the exhaustion agent of claim 13.

21. A stable, exhaustible composition for treating fibers or fabric to increase oil repellency, water repellency, or both, comprising a stable aqueous dispersion of the exhaustion agent of claim 8.

22. A method of increasing oil repellency, water repellency, or both, of a fiber or fabric, comprising:
   contacting the fiber or fabric with an aqueous solution comprising:
      a fluoropolymer;
      an exhaustion effective amount of an emulsion of polymerized monomers, wherein the monomers comprise:
         (meth)acrylic acid;
         alkyl (meth)acrylate; and
         a substituted or unsubstituted styrene;
      wherein the polymerized monomers form particles having an average particle size less than about 220 nm; and
      an optional hydrotropic compound;
   exhausting the fluoropolymer onto the fiber or fabric.

23. The method of claim 22, wherein the average particle size of the emulsified particles is between about 100 nm and about 200 nm.

* * * * *

UNITED STATES PATENT AND TRADEMARK OFFICE
CERTIFICATE OF CORRECTION

PATENT NO. : 6,524,492 B2
DATED : February 25, 2003
INVENTOR(S) : Michael S. Williams and R. Richard Sargent It is certified that error appears in the above-identified patent and that said Letters Patent is hereby corrected as shown below:

<u>Title page,</u>
Item [57], ABSTRACT,
Line 7, delete "particles is less than" and insert -- particles less than --

<u>Column 1,</u>
Lines 26 and 27, delete "lower the surface tensionof the fiber or fabric below the surface energy of water or oils" and insert -- lower the surface energy of the fiber or fabric below the surface tension of water or oils --

<u>Column 4,</u>
Line 64, delete "331 1" and insert -- 3311 --

Signed and Sealed this

Sixteenth Day of September, 2003

JAMES E. ROGAN
*Director of the United States Patent and Trademark Office*